United States Patent Office 3,240,670
Patented Mar. 15, 1966

3,240,670
INJECTABLE PHARMACEUTICAL EMULSIONS CONTAINING LIQUID ORGANOPOLYSILOXANES
Joseph George Feinberg, Chelsea, London, England, assignor to Beecham Group Limited, Brentford, Middlesex, England, a British company
No Drawing. Filed Aug. 11, 1961, Ser. No. 130,754
Claims priority, application Great Britain, Aug. 12, 1960, 27,984/60
6 Claims. (Cl. 167—58)

This invention relates to emulsions and is particularly concerned with emulsions of the water-in-oil type used as media for injectable pharmaceutical compositions.

Water-in-oil emulsions are used as media for injectable pharmaceutical compositions particularly when it is desired to retard the release of the therapeutic agent from the site of injection into the surrounding environment. Such emulsions consist of a dispersion of aqueous droplets in a continuum of mineral, animal or vegetable oil.

A disadvantage of water-in-oil emulsions is that they normally possess a tendency towards "creaming" in which a part of the oily phase separates from the body of the emulsion. Two major features that favour "creaming" are insufficient viscosity of the continuous phase, i.e. the oil, and disparity between the specific gravities of the aqueous and non-aqueous phases.

It is an object of the present invention to provide water-in-oil emulsion of enhanced stability suitable for use as an injectable pharmaceutical medium. This object is achieved by partly or wholly replacing the oil in the continuous phase by one or more water-immiscible silicone fluids.

As used herein, the term "silicone fluid" refers to organopolysiloxanes and mixture thereof, and is intended to include copolymers thereof, such as organopolysiloxane-hydroxyalkylene copolymers.

According to the present invention there is provided an injectable pharmaceutical medium comprising a substantially stable water-in-oil emulsion in which the oil of the continuous phase at least in part consists of one or more water-immiscible silicone fluids.

Preferably the oil of the continuous phase consists wholly of a silicone fluid.

The emulsions of the present invention may be prepared by means of standard mechanical emulsifying procedures, and surfactant emulsifying agents of the anionic, cationic, non-ionic, ampholytic type or finely dispersed solid type, or mixtures of such agents may be included in the mixture from which the emulsion is to be prepared.

Examples of silicone fluids used in accordance with the present invention include dimethyl- and phenylmethyl-polysiloxanes of various molecular weights and viscosities.

Many silicone fluids are miscible with each other and some are miscible with animal, mineral and vegetable oils. It has been found that by appropriate combination it is possible to produce water-immiscible fluids of any desired specific gravity and/or viscosity within the limits of the corresponding properties of the materials employed.

Organopolysiloxanes are normally pharmacologically inert and well tolerated by the living animal. They are generally non-irritant and non-sensitising when injected. Injectable pharmaceutical media according to the present invention are of particular value for use in pharmaceutical compositions comprising a therapeutic agent, such as an allergen, vaccine or antibiotic.

The following examples illustrate the invention. The silicone fluids used were obtained from Midland Silicones Limited and are identified by their commercial code number (MS number), which is the same as the designation given by Dow Corning Corporation (DC number). The viscosities of the fluids in centistokes (cs.) are also indicated in the designation.

EXAMPLE 1

A water-in-oil emulsion was prepared in standard commerical emulsifying apparatus with a combination of a mineral oil and a silicone fluid together having a specific gravity of approximately 1. The composition of the emulsion was as follow:

| | Ml. |
|---|---|
| Light mineral oil (B.P.) | 47 |
| Silicone fluid MS 510/50 cs. | 100 |
| Mannide mono-oleate | 20 |
| Water | 84 |

EXAMPLE 2

A water-in-oil emulsion was prepared in which the oil consisted wholly of a silicone fluid, which had a specific gravity of 0.99. The composition of the emulsion was as follows:

| | Ml. |
|---|---|
| Silicone fluid MS 510/50 cs. | 70 |
| Mannide mono-oleate | 10 |
| Water | 40 |

EXAMPLE 3

A water-in-oil emulsion was prepared from a blend of two silicone fluids, which had a viscosity of about 200 cs. and a specific gravity of about 1. The composition of the emulsion was as follows:

| | Ml. |
|---|---|
| Silicone fluid MS 510/50 cs. | 38 |
| Silicone fluid MS 510/500 cs. | 62 |
| Mannide mono-oleate | 14 |
| Water | 57 |

EXAMPLE 4

Three water-in-oil emulsions having the following compositions were prepared:

I

| | Ml. |
|---|---|
| Silicone fluid MS 702 | 1 |
| Viscous lanoline absorption base | 3 |
| Mannide mono-oleate | 0.1 |
| 5% aqueous extract of Timothy grass pollen | 2 |

II

| | |
|---|---|
| Silicone fluid MS 550/100–150 cs. | 2 |
| Viscous lanoline absorption base | 3 |
| Mannide mono-oleate | 0.1 |
| 5% aqueous extract of Timothy grass pollen | 2 |

III

| | |
|---|---|
| Silicone fluid MS 704 | 1 |
| High cholesterol lanoline | 3 |
| 5% aqueous extract of timothy grass pollen | 3 |

These emulsions are prepared for use in the clinical desensitisation of persons allergic to Timothy grass pollen. The extract of timothy grass pollen may be replaced by extracts of other pollens, moulds, foods and other allergens.

I claim:

1. An injectable pharmaceutical composition comprising a therapeutic agent in a substantially stable water-in-oil emulsion in which the oil phase comprises a water-immiscible liquid organo-polysiloxane.

2. An injectable pharmaceutical composition comprising a therapeutic agent in a substantially stable water-in-oil emulsion in which the oil phase comprises a water-immiscible liquid organo-polysiloxane selected from the group consisting of dimethylpolysiloxane and phenylmethylpolysiloxane.

3. An injectable composition according to claim 2 in which the therapeutic agent is an allergen.

4. An injectable pharmaceutical composition according to claim 2 including a surfactant emulsifying agent.

5. An injectable, substantially stable water-in-oil pharmaceutical emulsion in which the aqueous phase comprises an extract of a pollen and the oil phase comprises a water-immiscible liquid organo-polysiloxane.

6. An injectable, substantially stable water-in-oil pharmaceutical emulsion in which the aqueous phase comprises an extract of a pollen and the oil phase comprises a water-immiscible liquid organo-polysiloxane selected from the group consisting of dimethylpolysiloxane and phenylmethylpolysiloxane.

References Cited by the Examiner

UNITED STATES PATENTS

| 1,791,878 | 2/1931 | Strauch | 167—82 |
| 3,096,249 | 7/1963 | Prigal | 167—82 |

OTHER REFERENCES

McGregor, Silicones in Medicine and Surgery, 1957, Dow Corning Corporation, pages 23–25.

JULIAN S. LEVITT, *Primary Examiner.*

MORRIS O. WOLK, *Examiner.*